Feb. 6, 1962 R. A. JEROTHE 3,020,194
TWO-SIDED LAMINATOR
Filed Jan. 22, 1958 2 Sheets-Sheet 1

FIG.I

INVENTOR.
RUDOLPH A. JEROTHE
BY Oldham & Oldham
ATTYS.

INVENTOR.
RUDOLPH A. JEROTHE
BY
Oldham & Oldham
ATTYS.

United States Patent Office 3,020,194
Patented Feb. 6, 1962

3,020,194
TWO-SIDED LAMINATOR
Rudolph A. Jerothe, Wayne, N.J., assignor to Toscony Fabrics Incorporated, New York, N.Y., a corporation of New York
Filed Jan. 22, 1958, Ser. No. 710,524
3 Claims. (Cl. 156—583)

This invention relates to the laminating of thermoplastic materials and woven sheet materials and especially to the provision on opposite sides of a woven fabric backing of facings of plastic material.

It is an object of the present invention to provide plastic facings on both faces of a fabric backing in a single operation and to emboss the materials in the same operation.

This and other objects will be apparent from the following description, reference being had to the accompanying drawing forming a part hereof.

Figure 1:
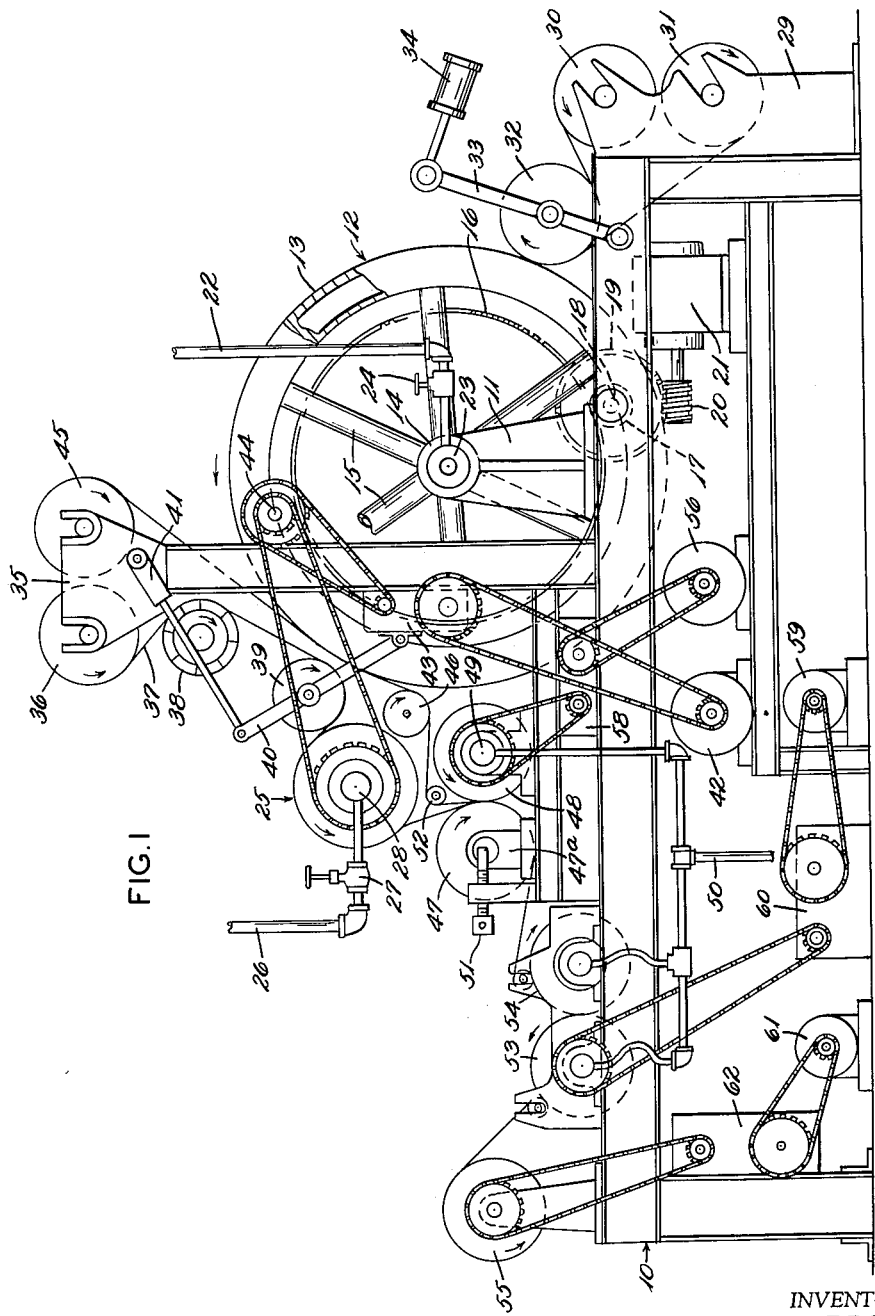
FIG. 1 is a side elevation of an apparatus constructed in accordance with and embodying the invention, parts being broken away and parts shown in section.
Figure 2:
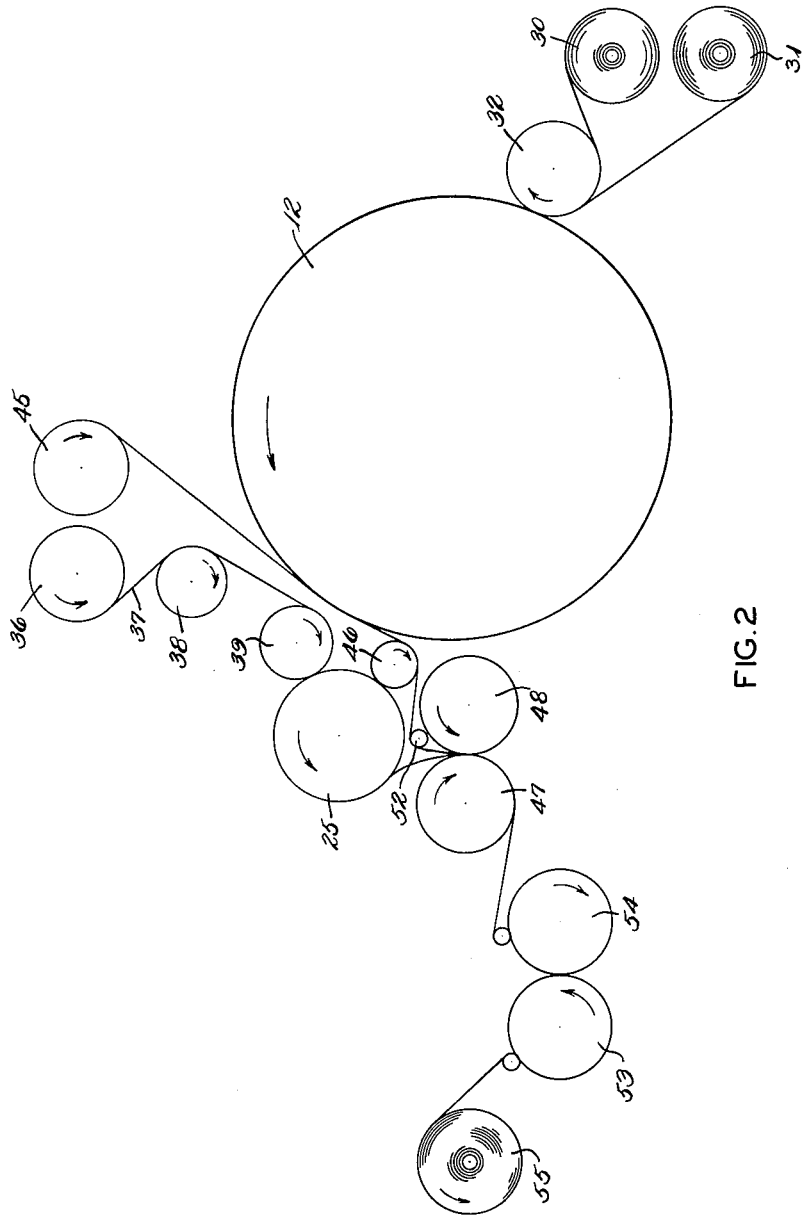
FIG. 2 is a schematic diagram of the same.

Referring to the drawings, the numeral 10 designates a frame on which is mounted, at each side thereof a pedestal 11 for journalling a rotatable drum 12. The drum comprises a hollow rim 13 held in spaced relation to a hollow axle 14 to which it is connected and supported by hollow spokes 15. For driving the drum, a gear wheel 16 is fixed to the drum in position to be driven by a pinion 17 on a shaft 18. Shaft 18 carries a worm gear 19 which engages a worm 20 driven by a motor 21. For heating the drum, a steam pipe 22 is connected to the hollow axle of the drum at one end thereof through a slip connection 23 and steam supply is controlled by a valve 24. A similar slip connection at the opposite end of the axle provides for exhaust from the drum.

A second heated drum 25 is mounted for rotation on frame 10 with its axis parallel to that of drum 12. It is supplied with steam in a similar manner from a pipe 26 by way of a valve 27 to a slip connection 28, there being a similar slip connection and exhaust connections thereto at the opposite end of the roller. The second heated drum is smaller in diameter than drum 12. The drums 12 and 25 are used for progressively heating films of vinyl or other plastic material. A supply of plastic film is provided for feeding drum 12 and includes a rack 29 having slotted bearings for rotatably supporting supply rolls 30, 31 from which the film may be drawn selectively. A pressure roller 32 is rotatably mounted on a swing frame 33 pivotally secured to the frame and may be pressed toward the drum 12 by fluid operated cylinders 34.

The supply of film for drum 25 comprises a notched frame member 35 in which a roll 36 of film, either plain or printed, may be rotatably mounted. The film 37 from roll 36 is drawn over a slatted expander roller 38 and about a lay-on pressure roller 39. Roller 39 is pressed against the face of roller 25 and for this purpose is mounted for rotation in a swing frame 40 which is urged against drum 25 by fluid operated cylinders 41.

For driving drum 25, a motor 42 is provided. This drives a variable speed drive 43 which drives a countershaft 44 which in turn drives drum 25 through suitable chains and sprockets. The slatted roller 38 is not driven. By adjusting the variable speed unit 43 the relative speed of drums 12 and 25 may be correlated.

For supplying the fabric layer, a supply roll 45 is mounted for rotation on frame members 35. The fabric therefrom is passed tangentially to drum 12 and is superimposed on the plastic film carried thereby.

Located between drums 12 and 25 and close to each of them is a metal stripper roller 46. Below drum 25 is a pair of squeeze rolls 47, 48. Roller 48 is preferably an embossing roller and is journalled in stationary bearings on frame 10. It is hollow and is supplied with refrigerated liquid to cool it by a slip connection 49 and a pipe 50. The opposite end of the roller has a refrigerant return slip connection.

Roller 47 may be pressed against roller 48 with considerable force to emboss the material and for this purpose its bearings 50 are movable along the frame 10 by screw jacks 51 or similar means. Above the bite of rollers 47, 48 is a guide roller 52. The heated fabric with the heated plastic film on one face thereof is lifted from the larger drum 12 at a temperature near the melting point of the plastic by stripper roller 46 and is passed about guide roller 52 a short distance to the bite of rollers 47, 48, the heated fabric maintaining the temperature of the plastic film thereon. The film from the smaller drum 25 is drawn directly therefrom at substantially the same temperature to the bite of rollers 47, 48 where it is pressed against the fabric layer at the bite of the rollers at the near melting temperature of the plastic avoiding air pockets and poorly adhered areas. The materials are pressed, embossed and cooled at rollers 47, 48.

Further cooling of the laminated material is provided by rotatably cooling cans 53, 54 about which the material is threaded. The finished material is wound on a roller 55.

For driving the roller 48, a motor 56 is provided and drives a variable speed unit 58 which in turn drives the roller through chain and sprocket connections.

For driving the cooling cans 53, 54 a motor 59 may be provided. This drives the cans through a variable speed changer unit 60, the parts being driven from one another by chains and sprockets. Cans 53, 54 may be driven from motor 21 if desired.

For driving the wind-up roller 55 a motor 61 is provided and drives the roller through a variable speed unit 62 by means of suitable sprockets and chains.

The operation of the apparatus should be apparent from the above description. Rolls of plastic film 30, 31 and 36 and a roll of fabric 45 are placed in their respective positions. Drums 12 and 25 are heated to the proper temperature for softening the plastic film. Film from roll 30 or 31 is led about roller 32 to the face of drum 12. Film from roller 36 is led over slatted roller 38 and presser roller 39 to the face of heated drum 25. Fabric from roll 45 is led directly to the face of the film on roll 12. The fabric is then heated to the temperature of the film which is close to its melting temperature. The heated film is carried on the heated fabric about rollers 46 and 52 to the bite of rollers 47, 48 where the plastic film from drum 25 is brought face to face with the heated fabric from drum 12 as the materials enter the bite of the rollers. The laminated material is then pressed, embossed and cooled. The laminated partially cooled material is then led about cooling cans 53, 54 for further cooling and is wound up on roll 55.

The apparatus provides for first simultaneously heating the two plastic films to soften them, then feeding the fabric progressively onto one of the films while the film is warm and softened and then feeding the second warmed and softened film onto the uncoated side of the fabric, then squeezing the assembled materials to press and emboss them while cooling them, and finally completing cooling and winding in roll form.

While a certain representative apparatus has been shown in order to illustrate the invention, it will be apparent to those skilled in the art that various changes and modifications may be made without departing from the scope of the invention as it is defined by the following claims.

I claim:

1. Apparatus for forming a two-sided laminate of fabric and plastic material, said apparatus comprising a cylindrical drum having a circumferentially extensive heating face for simultaneously heating and supporting a substantial arcuate reach of plastic material, means for heating and rotating the drum, means supporting a supply of plastic film material, a pressure roll for laying the film material progressively on the face of the drum, means supporting a supply of fabric material arcuately remote from said pressure roll and for progressively laying fabric under tension from said supply onto the heated film carried by said drum, a second heated drum having a circumferentially extensive heating face for simultaneously supporting and heating a substantial arcuate reach of plastic material, means for delivering a second thermoplastic film material progressively to said second heated drum, a stripper roller near the faces of both said drums but arcuately spaced from the point of contact of the fabric with said first drum for progressively lifting the superimposed and heated fabric and plastic film material from the first said drum, a pair of cooperating squeeze rollers receiving the lifted fabric and film material and the second film material and pressing them together into a laminate with the fabric between the film materials, one of said rolls having cooling means for cooling the laminate, and additional cooling means for continuing the cooling of the laminate formed in said squeeze rolls.

2. Apparatus for forming a two-sided laminate of fabric and plastic material, said apparatus comprising a rotatable heating drum having a circumferentially extensive heating face for simultaneously supporting and heating a substantial arcuate reach of plastic material, means for heating and rotating the drum, means for progressively laying a plurality of films of plastic material on the face of said drum, means spaced about the drum from said film laying means for progressively laying a fabric backing on the films supported by said drum, a second rotatable heating drum having a circumferentially extensive heating face for simultaneously supporting and heating a substantial arcuate reach of plastic material, means for progressively laying a second film of plastic material on said second drum, a stripper roll for stripping the plastic material and fabric from the first heated drum, said stripper roll being arcuately spaced from the point of contact of said fabric backing with said plastic material to permit heating of said fabric backing to substantially the temperature of said first drum, means for delivering the second film of plastic material from the second heated drum and superimposing it on the bare face of the heated fabric to form a laminated material, and means for pressing and cooling the laminated material progressively, said means for pressing and cooling including an embossing roll, a cooperating backing roll, and means for pressing one toward the other.

3. Apparatus as in claim 1 where a slatted undriven expander roll is provided, the plastic film material delivered to said second heated drum passing over said expander roll under tension prior to deposit onto said second drum.

References Cited in the file of this patent

UNITED STATES PATENTS

| | | |
|---|---|---|
| 2,171,259 | Scott | Aug. 29, 1939 |
| 2,240,072 | Hodgdon et al. | Apr. 29, 1941 |
| 2,334,485 | Ettl | Nov. 16, 1943 |
| 2,593,553 | Francis | Apr. 22, 1952 |
| 2,680,468 | Lewis | June 8, 1954 |
| 2,759,866 | Seymour | Aug. 21, 1956 |